United States Patent [19]
Waldmann

[11] 3,855,519
[45] Dec. 17, 1974

[54] VOLTAGE CONTROLLER FOR SYNCHRONOUS ELECTRIC MACHINES

[75] Inventor: Hermann Waldmann, Weiher b. Erlangen, Wiesentra 14, Germany

[73] Assignee: Siemens Aktiengesellschaft, Munich, Germany

[22] Filed: May 2, 1973

[21] Appl. No.: 356,297

[30] Foreign Application Priority Data
May 4, 1972 Germany............................ 2221877

[52] U.S. Cl.................................... 322/20, 322/24
[51] Int. Cl.............................................. H02p 7/28
[58] Field of Search........................... 322/20, 24, 25

[56] References Cited
UNITED STATES PATENTS

| | | | |
|---|---|---|---|
| 3,548,287 | 12/1970 | Blaschke et al...................... | 322/24 |
| 3,652,920 | 3/1972 | South et al......................... | 322/24 X |
| 3,656,048 | 4/1972 | Hauf................................. | 322/20 X |
| 3,714,541 | 1/1973 | Kuwabara et al.................... | 322/24 |

*Primary Examiner*—James D. Trammell
*Attorney, Agent, or Firm*—Kenyon & Kenyon Reilly Carr & Chapin

[57] ABSTRACT

An improved voltage controller for a synchronous electric machine of the type including a voltage controller including a controlled rectifier coupled thereto which is optimally matched to the parameters of the machine for its non-loaded condition. The improvement comprises a modulator coupled to the excitation winding and the controller of the machine, for generating a control signal which is proportional to the cosine of the load angle of the machine. The modulator modulates any output signal generated by the voltage controller of the machine according to the generated control signal. A voltage compensator coupled to the modulator generates a voltage compensation signal which is proportional to the current induced in the stator winding of the machine by the load applied thereto. The compensator also adds the compensation signal generated to the modulated output signal of the controller, which signals in combination form the voltage control input signal to the controlled rectifier of the machine and increase the current in the excitation winding of the machine in response to a load applied thereto, and thereby compensate for the reaction produced by the current induced in the stator winding of the machine by the load.

8 Claims, 3 Drawing Figures

VOLTAGE CONTROLLER FOR SYNCHRONOUS ELECTRIC MACHINES

BACKGROUND OF THE INVENTION

1. Field of the Invention

The invention relates to synchronous electric machines, and in particular to an improved voltage controller for a synchronous electric machine.

2. Description of the Prior Art

In order to obtain favorable dynamic behavior of synchronous electric machines, the characteristics of the voltage controller thereof should be matched to the parameters of the electric machine controlled. Synchronous electric machine parameters which are necessary to control the machine voltage, such as, for example, the control circuit loop gain, and the time constant of the exciter supplying the machine field, are dependent upon the load applied to the synchronous machine. Thus, the control circuit loop gain and the exciter time constant can vary by up to one order of magnitude, if, for example, an idling synchronous electric machine is coupled to the controller circuit. Up to the present time, such control circuits could only be optimized for a specific load applied to the synchronous electric machine. Under all other loading conditions, a significantly less desirable machine dynamic behavior results.

SUMMARY OF THE INVENTION

It is therefore an object of the invention to provide a voltage control circuit for a synchronous electric machine which is matched to the parameters of the controlled machine under all loading conditions thereof.

It is also an object of the invention to provide a synchronous electric machine whose dynamic behavior is substantially invariable regardless of the load applied thereto.

According to the invention, the above problem is solved by providing a voltage compensation signal which compensates for the current induced in the stator winding of the machine by inducing compensating current in the excitation winding of the machine, and by modulating the output signals of the voltage controller of the machine so that the controller is optimally matched to the synchronous machine for both loaded and non-loaded conditions. The improved voltage controller of the invention is utilized in a synchronous electric machine of the type including a voltage controller including a controlled rectifier coupled thereto, which is optimally matched to the parameters of the machine for its non-loaded condition, and comprises modulating means, coupled to the excitation winding and voltage controller of the machine, for generating a control signal which is proportional to the cosine of the load angle of the synchronous machine. This control signal is used to modulate output signals generated by the voltage controller. Compensating means, coupled to the modulating means, generates a voltage compensation signal which is proportional to the current induced in the stator winding of the machine by the load applied thereto. The compensating means also adds the compensation signal generated to the modulated output signal of the controller. The modulated and compensation signals in combination form an input signal to the controlled rectifier, and increase the excitation winding current in response to a load applied to the machine.

In one embodiment of the invention, the modulating means comprises a coordinate transformer and a vector rotator coupled to the excitation and stator windings of the machine for generating voltage signals proportional to the vector components of the current induced in the stator windings of the machine by a load. Operational amplifiers coupled in series to the vector rotator generate voltage signals which are representative of the magnetic flux vector components generated by the current in the excitation windings of the machine. A vector analyzer processes the signals representative of the flux components and generates an output signal proportional to the cosine of the load angle of the machine, which is the control signal utilized to modulate the output signal of the voltage controller. The compensating means of the invention comprises a magnetic field simulator, consisting of a feedback amplifier and a constant current source, and an analog integrator, coupled to the simulator, for generating a compensation signal proportional to the vector component of the magnetic field in the excitation winding which is directed along the longitudinal, i.e., direct, axis of the rotor of the machine. The modulated signal produced is added to the compensation signal by a mixer and transmitted to the controlled rectifier in order to increase the current flow in the excitation winding of the machine and compensate for the reaction produced by the current induced in the stator winding.

The essence of the invention disclosed is therefore to optimize the adjustment of the voltage controller when the synchronous machine is in a non-loaded condition and to vary the output signal of the voltage controller when a load is applied, in order to compensate for any armature reaction by exactly the voltage necessary to maintain the prescribed voltage of the machine when the machine is loaded. This optimal adjustment and matching of the voltage control parameters to the machine may be effected according to any desired optimum criteria, such as, for example, absolute value or symmetry optimum criteria. Although the armature reaction produced by loading the machine might be simulated by means of complicated function generators, it is considerably more simple to generate and introduce into the voltage controller circuit the described compensation voltage and to modulate the output signals of the voltage controller. A voltage controlled synchronous electric machine having dynamic behavior characteristics which are superior to those of conventional similar type machines is thereby provided.

DETAILED DESCRIPTION

Figure 1:
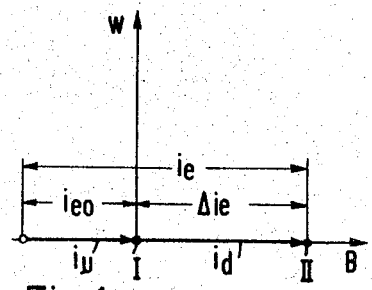
FIG. 1 is a graphical illustration of the excitation and magnetizing currents in the field and stator windings of a synchronous electric machine constructed according to the invention.

Referring now to the current vector diagram of the synchronous electric machine of the invention illustrated in FIG. 1, it will be noted that at operating condition I, which corresponds to the non-loaded condition of the machine, the machine excitation current $i_{e0}$ is equal in magnitude to the required armature magnetizing current $i_u$. When the electric machine is loaded inductively, the operating condition thereof which corresponds to operating point II in FIG. 1, the field winding excitation current $i_e$ must be increased over the non-loaded condition excitation current $i_{e0}$ by a current amount of $\Delta i_e$ in order to compensate for the reaction produced by the load current $i_d$ in the armature winding of the machine. According to the invention, the voltage controller generates that portion of the excitation current which corresponds to $i_u$, and the remainder, i.e., the portion $i_e$ or $i_d$, is generated by separate means to be described in detail below.

Figure 2:
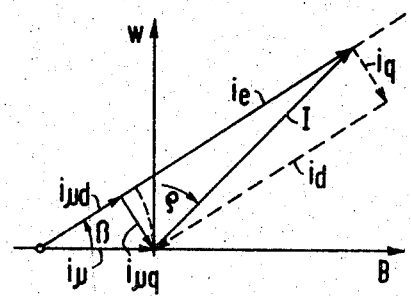
FIG. 2. is a graphical illustration of the resistive-inductive loading of a synchronous electric machine constructed according to the invention.

As shown in FIG. 2, the excitation current vector $i_e$ defines in combination with the reactive-current axis B, the machine load angle $\beta$. The machine stator (armature) current vector I defines in combination with the active-current axis W the angle $\phi$ (which is not equal to 0), and has a reactive current component. Current vectors I and $i_e$ provide two vector components $i_d$ and $i_q$ directed along, and transverse, respectively, to the longitudinal axis of the machine rotor, i.e., along the direct and quadrature axes thereof. Vector component $i_q$ forms part of the magnetizing current $i_u$ required. That is it has a component directed along the B axis which forms a part of the vector $i_u$. From FIGS. 1 and 2, it can be seen that the excitation current vector $i_e$ is made up of two components. One of these is the component $i_d$ and the other the component $i_u$ of FIG. 1 or $i_{ud}$ of FIG. 2. As will be seen more clearly below, these two components are separately supplied by different parts of the apparatus of the present invention. That is, the component $i_u$ is supplied by the voltage controller and the component $i_d$ from a flux simulator according to the present invention. If the output of the voltage controller is selected to be $i_u$, i.e., the value needed under the no-load condition of FIG. 1 or the value needed for a purely inductive load as also illustrated by FIG. 1, then if that same value is supplied under the conditions illustrated by FIG. 2, the excitation current $i_e$ will be larger than required. As noted above, this is due to the contribution to the vector $i_u$ from the component $i_{uq}$. In accordance with the present invention, it is desired that the voltage controller output a voltage proportional to $i_u$. Thus, it is necessary that this voltage be multiplied by a factor equal to $\cos \beta$ where $\beta$ is the load angle of the machine as shown on FIG. 2, to provide the proper contribution $i_{ud}$ which, when taken together with $i_{uq}$, which is equal to $i_q$, will give the proper value of $i_u$ as illustrated on FIG. 2.

Figure 3:
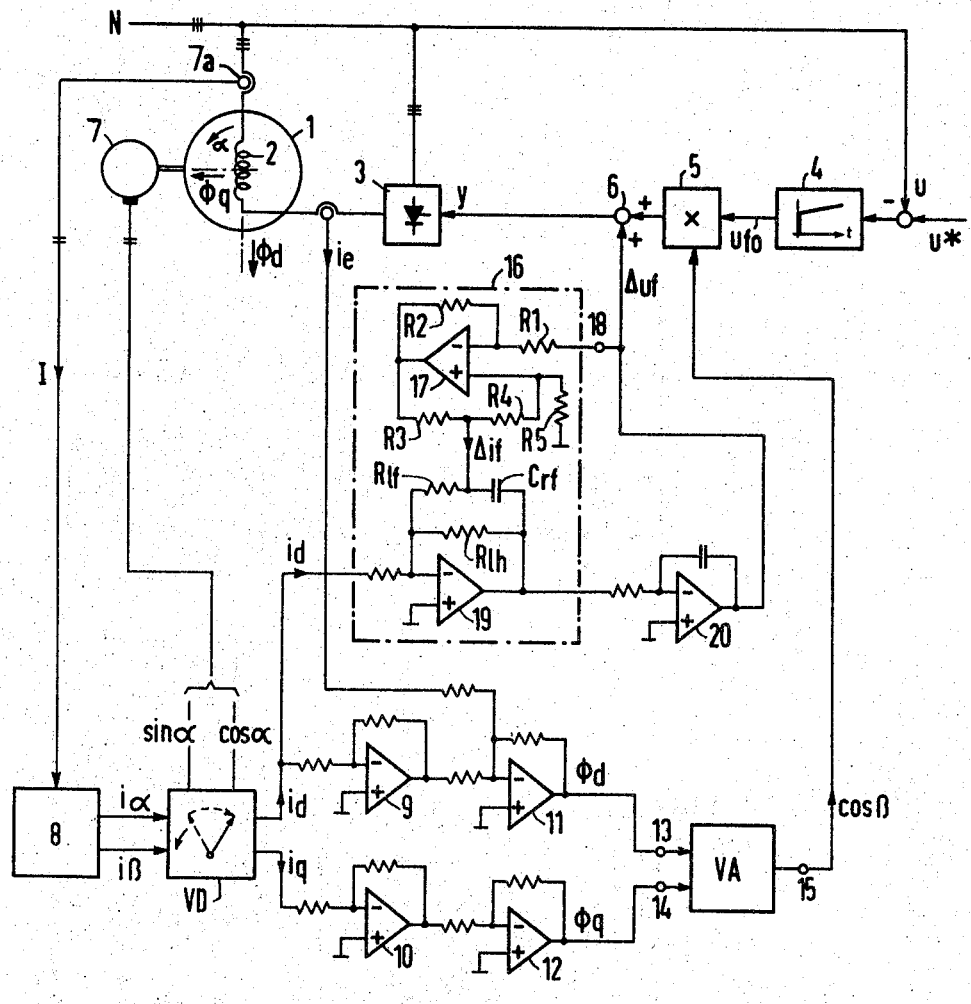
FIG. 3 is a schematic electric diagram of an improved voltage controller for a synchronous electric machine constructed according to the invention.

Referring now to the schematic diagram of the voltage controller of the invention illustrated in FIG. 3, there is shown a synchronous electric machine 1 having the stator windings thereof coupled to a three-phase line designated as N. Although an AC machine may comprise either a motor or a generator, synchronous machines operating equally well in both manners, it can be assumed for the present that the disclosed machine 1 is a generator supplying current to the three phase line N. Excitation winding 2 is mounted on the machine rotor, and generates magnetic fluxes, as previously indicated, along the longitudinal (direct) axis of the machine rotor, designated as $\phi_d$, and transverse thereto, (along the quadrature axis) designated as $\phi_q$. The current supply to excitation winding 2 is controlled by a controlled rectifier 3, which may, for example, comprise a silicon controlled rectifier. The input control voltage Y to controlled rectifier 3 is proportional to the output voltage, thereof i.e., the rotor excitation voltage. A voltage controller 4 is coupled in series to the controlled rectifier. The input voltage to the controller is supplied thereto by a summing circuit, such as an analog adder, which determines the difference between the stator winding voltage U and a predetermined reference voltage U*. Controller 4 is a proportional analog integrator whose linear gain and lead time are optimally matched to the no-load condition of the synchronous machine according to, for example, optimum symmetry criteria. The output voltage $U_{fo}$ of controller 4 is transmitted to a modulating means, which includes a multiplier 5 coupled thereto. As noted above, the controller 4 is adapted to provide an output voltage $u_{fo}$ proportional to the current $i_u$ shown on FIG. 1.

The voltage output of controller 4, and a voltage signal proportional in magnitude to the cosine of the load angle $\beta$, generated by a compensating means, form the input signals to multiplier 5. The modulated output signal formed by the multiplier is transmitted to a signal mixer 6, which may, for example, comprise an analog summing amplifier. After multiplication by the cosine of $\beta$ the value at the output of the multiplier 5 will be a voltage proportional to the current $i_{ud}$. The other input signal to mixer 6 is the voltage signal $\Delta U_f$ which, as discussed with respect to FIGS. 1 and 2, compensates for the magnetic flux reaction produced by the armature current $i_d$ along the longitudinal axis of the machine rotor. That is, the signal $\Delta u_f$ is proportional to the quantity $i_d$ so that quantities proportional to $i_{ud}$ and $i_d$ are now being added to obtain a voltage Y which is proportional to the desired output of the rectifier $i_e$.

The voltage signals proportional to $\Delta U_f$ and cosine $\beta$ are generated as follows:

Two of the three phase currents of the stator winding are measured by means of current transformers, designated schematically as 7a, and are converted by a coordinate transformer 8 coupled thereto by known methods into two voltage signals $i\infty$ and $i\beta$ which are proportional to two components which describe the stator current vector I of the induced stator winding current in a stator-orientated orthogonal coordinate system. A vector rotator VD, coupled to the coordinate transformer 8, transforms component voltages $i\infty$ and $i\beta$ by known methods into their corresponding machine loaded axis-orientated current components $i_d$ and $i_q$. Coordinate transformer 8, vector rotator VD, and vector analyzer VA, to be described below, may all be constructed as described in German Offenlegungsschrift No. 1,941,312 or in accordance with the corresponding U.S. Pat. application Ser. No. 237,572. Specifically, a coordinate transformer is disclosed on FIG. 8 of those references, a vector rotator in connection with FIG. 6 and a vector analyzer in connection with FIG. 5. Another example of vector rotator is that disclosed in U.S. Pat. No. 3,457,394. The voltage output signals of coordinate transformer 8 are fed to the vector rotator, in combination with the output voltage signals sine $\infty$ and cosine $\infty$ of a synchro 7 coupled to the rotor of the synchronous machine. The angle $\infty$ represents the angle of rotation of the rotor relative to a stator winding axis. Reference to FIG. 2 is helpful in understanding what is occuring here. The axis B could be considered the fixed stator winding axis. The values $i\alpha$ and $i\beta$ then would refer to the components of the vector I along the axes W and B. The angle $\alpha$ obtained from the resolver 7 will represent the angle that the component $i_d$ makes with the axis B. That is, the component $i_d$ is the component along the rotor or excitation direct $d$ axis. In the vector rotator VD, a rotation occurs so that the components formerly referenced to the axis B and W are now referenced to the rotor axis which is parallel to the component $i_d$ i.e., the vectors $i_d$ and $i_q$ are obtained. Transformers 7a, transformer 8, rotator VD and synchro 7 collectively form a means for generating output signals which are proportional to the vector components of the current induced in the stator winding of the machine by the load. Means for generating voltage signals which are proportional to the vector components of the magnetic flux $\phi_d$ and $\phi_q$, illustrated as first and second pairs of analog amplifiers 9-12, is coupled to vector rotator VD. The vector components $i_d$ and $i_q$ are processed by amplifiers 9 and 11, and 10 and 12, respectively, to produce output voltages representative of and proportional to the magnetic flux produced by the exciter winding 2. With reference to FIG. 2, it can be seen that the components of flux produced by the excitation winding will be dependent upon the quantities $i_{ud}$ and $i_{uq}$, the latter of which is equal to $i_q$. by the flux components $\phi_d$ and $\phi_q$ is thus generated. Amplifier 11 adds to the output of amplifier 9 an excitation current voltage proportional to current $i_e$ to produce rotor flux $\phi_d$. This addition is in effect a subtraction since the quantity $i_d$ was inverted through amplifier 9. The result can be seen again by reference to FIG. 2. The quantity $i_e$ provided as a second input to amplifier 11 is the total length of the vector $i_e$ shown thereon. The quantity $i_d$ obtained from the output of amplifier 9 represents the same component designated on FIG. 2. Thus, upon subtraction of these two quantities, the remaining quantity is $i_{ud}$. Nothing need be done to the quantity $i_q$ since $i_q$ and $i_{uq}$ are equal. The amplifiers thus simulate the flux produced by the excitation winding at the terminals 13 and 14 of the circuit. If the synchronous electric machine is of the type provided with damping windings, then amplifiers 11 and 12 would simply comprise negative resistance feedback amplifiers, wherein the ratio of the feedback resistance to the amplifier input impedance would correspond to the machine field winding inductance. The voltage outputs produced by amplifiers 11 and 12 are transmitted to input terminals 13 and 14 of a vector analyzer VA which generates a response thereto at its output terminal 15. A voltage signal which is proportional to the cosine of the load angle $\beta$ defined by the flux components $\phi_d$ and $\phi_q$ is thus generated. With the output of the voltage controller 4, which is a voltage $u_{fo}$ proportional to the current $i_u$ now multiplied by cos $\beta$, an output from multiplier 5 at the summing amplifier 6 proportional to the quantity $i_{ud}$ of FIG. 2 is now present. It is only necessary that a value $\Delta u_f$ proportional to the current $i_d$ now be added thereto in order to generate a voltage Y which will result in the required excitation current $i_e$ out of the rectifier 3.

The voltage compensation signal $U_f$ is a function of the armature excitation current $i_d$, and thus simulates the magnetic component $\phi_d$ directed along the longitudinal axis of the machine rotor. In order to generate this compensation voltage, means for generating an output signal proportional to the vector component generated along the longitudinal axis of the machine rotor of the magnetic flux generated by winding 2, illustrated as flux simulator 16, is provided. This simulator is described in detail in German Offenlegungsschrift No. 1,917,567. Briefly, the simulator comprises an amplifier 17 coupled to a plurality of resistors R1-R5 which in combination form a constant current source. The resistance values of input resistors R1 and R5, which are coupled to input terminal 18 of the simulator and the reference potential of the system, respectively, are determined by the relation:

$$R1 (R3 + R4) = R5 \cdot R2$$

Resistors R2–R4 comprise the feedback resistors of amplifier 17. The junction point of resistors R3 and R4 is coupled to the junction point of a negative feedback resistor $R_{1f}$ and capacitor $C_{rf}$ of a feedback amplifier 19, which is coupled to vector rotator VD. Amplifier 19 also includes a negative feedback resistor $R_{1h}$ coupled to its input and output terminals. The constant current $i_f$, which appears at the junction point between resistors R3 and R4, is always proportional to the compensating voltage $U_f$ at terminal 18, and is fed to the feedback path of amplifier 19 at the junction point of resistor $R_{1f}$ and capacitor $C_{rf}$. Stator current vector component $i_d$ is the input voltage signal fed to the negative input terminal of amplifier 19. If the value of the resistor $R_{1f}$ is chosen so as to be proportional to the inductance of the machine field winding; the value of resistor $R_{1f}$ is chosen to be proportional to the stray inductance of the field winding; and the capacitance of capacitor $C_{rf}$ is chosen to be inversely proportional to the resistance of the field winding, then the field generator 16 produces an exact simulation of the magnetic flux $\phi_d$.

The voltage output of amplifier 19 is transmitted to the input terminal of means for integrating the output of the simulator 16, illustrated as an analog integrator 20, whose output is in turn transmitted to excitation voltage input terminal 18 of field simulator 16 as a negative feedback signal, for determining the value of the excitation voltage $\Delta U_f$ which is required to compensate for the reaction produced by current component $i_d$. The integration time constant of integrator 20 is chosen to be at least one order of magnitude less than the time constant of the excitation circuit in order to effect rapid regulation of the output signal of simulator 16. The output signal of the amplifier is integrated until the input signal to amplifier 20 decreases in magnitude to 0, i.e., until the current component $i_d$ reaction is compensated for by excitation current $\Delta i_f$, which is, as previously stated, proportional to the voltage $\Delta U_f$ at terminal 18. The compensation voltage signal $\Delta U_f$ is then fed to mixer 6 and combined with the output of multiplier 5 to form the input voltage Y to controlled rectifier 3 for controlling the synchronous electric machine. It should be noted that the compensation voltage $\Delta U_f$, and the portion of the excitation current $i_e$ produced by it, need not be proportional in the described compensation system, since the integrating amplifier 20 functions as a regulator which insures the exact adjustment of the compensation voltage required to balance the machine parameters under all loads applied to the synchronous machine to achieve optimum dynamic behavior.

While there has been disclosed herein what is considered to be a preferred embodiment of the invention, it will be obvious to those persons skilled in the art that many changes and modifications may be made there-

What is claimed is:

1. In a synchronous electric machine, of the type including a stator winding, an excitation winding, and a voltage controller including a controlled rectifier coupled thereto, which is optimally matched to the parameters of the machine for its non-loaded condition, the improvement comprising:

modulating means, coupled to the excitation winding and controller, for generating a control signal proportional to the cosine of the load angle of the synchronous machine and modulating an output signal generated by the voltage controller according to said generated control signal; and compensating means, coupled to said modulating means, for generating a voltage compensation signal which is proportional to the current induced in the stator winding of the machine by the load applied thereto and adding said compensation signal to the modulated output signal of the controller, said modulated and compensation signals in combination forming an input signal to the rectifier for increasing the excitation winding current in response to a load applied to the machine.

2. The improvement recited in claim 1, wherein said modulating means comprises, first means, coupled to the excitation winding, for generating output signals proportional to the vector components of the current induced in the stator winding of the machine by the load; and second means, coupled to said first means, for generating output signals proportional to the vector components of the magnetic flux generated by the current in the excitation winding, including means for analyzing said magnetic flux component, and generating said control signal which is proportional to the cosine of said load angle of said machine.

3. The improvement recited in claim 2, wherein siad first means comprises at least one current transformer coupled to the stator winding of the machine, a vector coordinate transformer coupled to said current transformer, a synchro coupled to the excitation winding of the machine, and a vector rotator, coupled to said synchro and said coordinate transformer, for generating output signals representative of said stator winding current in a stator-oriented orthogonal form and transforming said signals to a machine rotor axis-oriented form.

4. The improvement recited in claim 2, wherein said second means comprises first and second pairs of amplifiers coupled to said first means, the input terminal of one of said amplifiers of one of said pairs being coupled to the excitation winding of the machine, said one of said amplifier pairs being responsive to the excitation winding current and one of said stator winding current component signals, and the other of said pairs being responsive to another of said stator winding current component signals for generating said magnetic flux vector component output signals.

5. The improvement recited in claim 1, wherein said compensation means comprises, first means for generating an output signal proportional to a selected one of the vector components of the magnetic flux generated by the excitation winding of the machine, and second means, coupled to said first means, for integrating said output signal generated by said first means and generating said voltage compensation signal.

6. The improvement recited in claim 5, wherein said integrating means comprises an analog integrator having an integrating time constant which is at least one order of magnitude greater than the machine excitation time constant.

7. The improvement recited in claim 5, wherein said first means comprises a feedback amplifier coupled to said modulating means, and a constant current source coupled to said amplifier and to said integrating means.

8. The improvement recited in claim 1, wherein said modulating means includes a multiplier coupled to the controller for modulating an output signal thereof according to said control signal which is proportional to the cosine of the load angle of the machine, and a mixer, coupled to said multiplier and the controlled rectifier, for forming said input signal to the rectifier.

* * * * *

UNITED STATES PATENT OFFICE
CERTIFICATE OF CORRECTION

PATENT NO. : 3,855,519
DATED : December 17, 1974
INVENTOR(S) : Hermann Waldmann

It is certified that error appears in the above-identified patent and that said Letters Patent are hereby corrected as shown below:

In column 7, line 41, change "siad" to --said--

In column 5, line 24, change "the latter of which is equal to $i_q$. by the flux components $\phi_d$ and $\phi_q$ is thus generated" to --the latter of which is equal to $i_q$.--

Signed and sealed this 15th day of April 1975.

(SEAL)
Attest:

RUTH C. MASON
Attesting Officer

C. MARSHALL DANN
Commissioner of Patents
and Trademarks